United States Patent [19]

Dukshtau et al.

[11] 4,021,691

[45] May 3, 1977

[54] ELECTRICAL MACHINE STATOR

[76] Inventors: Alexandr Antonovich Dukshtau, Basseinaya ulitsa, 111, korpus 3, kv. 34; Samuil Alexandrovich Prutkovsky, ulitsa Sojuza Pechatnikov, 17, kv. 85; Felix Moiseevich Detinko, prospekt M. Toreza, 104, korpus 3, kv. 23; Jury Sergeevich Golubentsev, Kubinskaya ulitsa, 70, korpus 1, kv. 14; Alexandr Nesanelevich Lurie, Belgradskaya ulitsa, 6, korpus 2, kv. 237, all of Leningrad, U.S.S.R.

[22] Filed: Feb. 18, 1975

[21] Appl. No.: 550,749

[52] U.S. Cl. .............................. 310/217; 310/260
[51] Int. Cl.² ................................ H02K 1/06
[58] Field of Search ......... 310/258, 254, 259, 272, 310/273, 157, 260, 216, 217, 218, 66, 51, 42, 194; 242/1 E; 336/210, 197

[56] References Cited

UNITED STATES PATENTS

| | | | |
|---|---|---|---|
| 1,428,889 | 9/1922 | Johnson | 310/258 |
| 1,784,643 | 12/1930 | Reist | 310/258 |
| 1,898,489 | 2/1933 | Kieffer | 310/258 |
| 2,078,668 | 4/1937 | Kilgore | 310/258 |
| 2,112,747 | 3/1938 | Wood | 310/258 |
| 2,484,259 | 10/1949 | White | 310/258 |
| 2,972,449 | 2/1961 | Roberts | 310/260 |
| 3,435,262 | 3/1969 | Bennett | 310/260 |
| 3,495,109 | 2/1970 | Ames | 310/260 |
| 3,867,654 | 2/1975 | Otto | 310/258 |

*Primary Examiner*—R. Skudy
*Attorney, Agent, or Firm*—Steinberg & Blake

[57] ABSTRACT

An electrical machine stator comprising a laminated iron core, with magnetic steel clamping plates installed on both ends of the core for clamping the core sheets by nonmagnetic steel clamping fingers rigidly attached to the clamping plates, with slots in said plates extending from top to bottom and used to accommodate the clamping fingers.

10 Claims, 3 Drawing Figures

ELECTRICAL MACHINE STATOR

The present invention relates to the art of electrical machine building, and more particularly, to electrical machine stators.

Known in the art are stators of electrical machines, which comprise a laminated iron core, with clamping asssemblies installed on both ends of the core and designed as clamping plates made integral with clamping fingers intended for holding the stator core sheets.

In other known stators of electrical machines, the clamping fingers are rigidly attached to the clamping plates by welding or other techniques. The clamping plates of said stators are manufactured from conventional magnetic steel, whereas the clamping fingers are made of nonmagnetic steel.

In the former case, the clamping assembly can either be made entirely of conventional steel which leads to excessive heating of the clamping assemblies, or can be manufactured entirely from nonmagnetic steel which is not practical from the point of view of economy.

The other prior-art stators suffer from a disadvantage residing in double-deck (double-height) design which affects the height of the end windings and thereby impairs the economic factors.

It is an object of the present invention to reduce the dimensions of the stator core and winding of electrical machines in axial direction through cutting down the height of the clamping assemblies (including the conventional magnetic steel end plates and the nonmagnetic steel thrust pins which bind the core on both end sides).

It is an object of the present invention to reduce the dimensions of the stator core and winding of electrical machines in axial direction through cutting down the height of the clamping assemblies (including the conventional magnetic steel clamping plates and the nonmagnetic steel clamping fingers which bind the core on both end sides).

This object is accomplished by that in an electrical machine stator incorporating a laminated iron core with nonmagnetic steel clamping plates installed on both ends of the core and used for clamping the core sheets by means of nonmagnetic steel clamping fingers anchored to the clamping plates, said clamping plates are provided, according to the invention, with slots directed from top to bottom and used to accommodate said clamping fingers.

Said slots are advantageously positioned in radial direction relative to the stator axis.

It is also advisable that said slots are cut through from one end to the other for minimizing the height of the clamping assembly.

The stator contrived according to the present invention will permit shortening the end portions of the stator winding bars by about 100 to 200 mm which will result in a substantial increase in efficiency and economic factors of the electrical machines, and of hydrogenerators in particular, due to lessening of the weight of copper material.

Heating of the clamping assembly herein proposed does not exceed the specified tolerances.

Compared to the prior-art stators, the cost of the proposed stator, provided with a clamping assembly, is lower.

The nature of the present invention will be clear from the following description of an embodiment of the invention taken in conjunction with the accompanying drawings, wherein.

Figure 1:
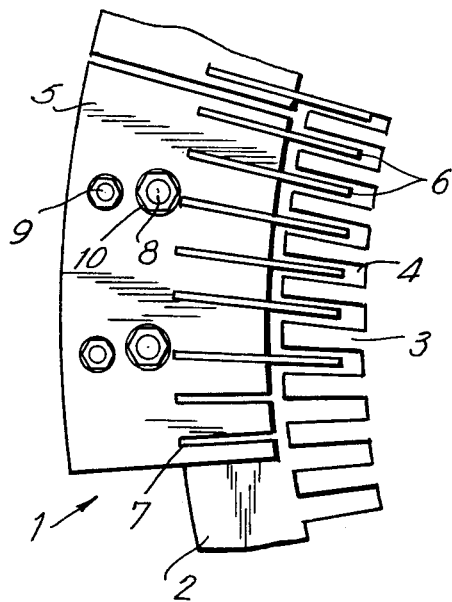
FIG. 1 is a partial end view of an electrical machine stator, according to the invention.
Figure 2:
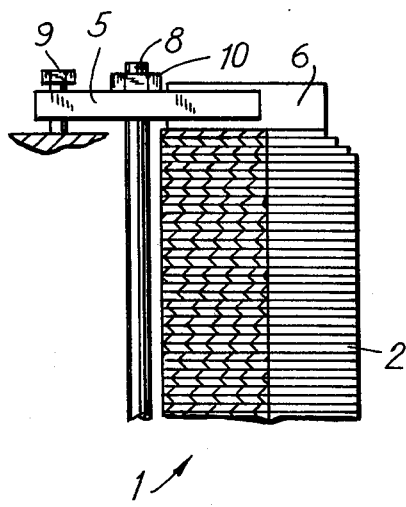
FIG. 2 is a side view of the same detail.

Referring now to FIGS. 1 and 2 which present only partial views of an electrical machine stator, the stator 1 includes a laminated iron core 2 composed of sheets. The sheets of the core 2 are provided with slots 3 and teeth 4, and are retained by means of clamping assemblies which are essentially clamping plates 5 connected rigidly to clamping fingers 6 (the drawings show only one assembly). For this purpose, through slots 7 are milled from top to bottom in the clamping plates 5 and are positioned radially relative to the axis of the stator 1, with the clamping fingers fitted into said slots and welded to the clamping plates 5. The plates 5 are fabricated from conventional magnetic steel, and the fingers 6 are made of nonmagnetic steel. Holes (not shown in the drawings) provided in the clamping plates 5 accommodate binding or tie rods 8 and tie bolts 9. The clamping plates 5 with the fingers 6 welded into the slots 7 are installed on both end sides of the core 2 of the stator 1 (the drawings shown only one end side), and are used for clamping the sheets of the core 2 by means of binding or tie rods 8 and nuts 10. The clamping fingers 6 are pressed against the teeth 4 of the core 2 of the stator 1. The tie bolts 9 directly engage the outer frame portion of stator 1 to permit adjustment of the thrust exerted in the area of the back and teeth 4 of the core 2.

Figure 3:
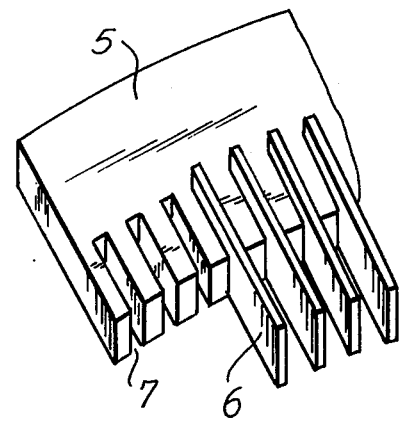
FIG. 3 is a perspective view of a stator clamping assembly.

FIG. 3 presents a perspective view of the clamping assembly comprising the clamping plates 5, the slots 7 thereof accommodating fingers 6 welded to the plate.

At the electrical machine operation, the fingers 6 transfer the axial force produced by the binding or tie rods 8 to the teeth 4 of the core 2, safely bear the loads because they are welded into the slots 7 of the clamping plates 5, and at the same time avoid heating because they are made of nonmagnetic steel.

The proposed design of the electrical machine stator is advantageous because the expensive nonmagnetic steel is used only to manufacture the clamping fingers which are made of nonmagnetic strip steel requiring no machining.

What is claimed is:

1. An electrical machine stator comprising an assembly of sheets forming a laminated iron core, and clamping means for clamping said sheets of said iron core together, said clamping means including clamping assemblies installed at each end of said core, and each clamping assembly including a plurality of non-magnetic steel fingers directly engaging an end sheet of the iron core and a clamping plate formed with slots respectively receiving said fingers with said fingers being rigidly fixed with said clamping plate.

2. The combination of claim 1 and wherein said slots of said clamping plate extend radially with respect to an axis of said core.

3. The combination of claim 1 and wherein said slots extend completely through said clamping plate.

4. The combination of claim 2 and wherein said slots extend completely through said clamping plate.

5. The combination of claim 1 and wherein said sheets of said laminated iron core are themselves formed with aligned radial slots and have teeth situated between said slots, and said fingers overlapping and directly engaging the teeth at an end sheet of the iron core.

6. The combination of claim 1 and wherein said fingers are in the form of strips having edges engaging an end sheet of the iron core.

7. The combination of claim 6 and wherein said strips have a width greater than the thickness of said clamping plate and being welded to the latter.

8. The combination of claim 7 and wherein said clamping plate is made of a magnetic steel.

9. The combination of claim 8 and wherein a tie-rod means is operatively connected with said clamping plate of each unit outwardly beyond the sheets of the iron core.

10. The combination of claim 1 and wherein said slots extend radially, with respect to an axis of said core, into said clamping plate from an inner edge region thereof toward an outer edge region thereof but terminate short of said outer edge region while extending completely through said clamping plate, and said fingers being in the form of strips extending into and filling said slots and being welded to said clamping plate with said strips respectively having edges directly engaging an end sheet of the iron core.

* * * * *